United States Patent [19]

Pfeifer

[11] 4,234,928

[45] Nov. 18, 1980

[54] X-RAY DIAGNOSTIC INSTALLATION FOR X-RAY PHOTOGRAPHS

[75] Inventor: Rolf Pfeifer, Erlangen, Fed. Rep. of Germany

[73] Assignee: Siemens Aktiengesellschaft, Berlin & Munich, Fed. Rep. of Germany

[21] Appl. No.: 970,399

[22] Filed: Dec. 18, 1978

[30] Foreign Application Priority Data

Feb. 27, 1978 [DE] Fed. Rep. of Germany ....... 2808288

[51] Int. Cl.³ ............................................. G11C 11/42
[52] U.S. Cl. .................................... 364/571; 364/107; 365/45; 250/320
[58] Field of Search ........................ 364/571, 900, 107; 250/320; 365/45, 49

[56] References Cited

U.S. PATENT DOCUMENTS

| | | | |
|---|---|---|---|
| 3,763,364 | 10/1973 | Deutsch et al. | 365/45 X |
| 4,021,651 | 5/1977 | Mitsuhashi et al. | 364/900 X |
| 4,137,571 | 1/1979 | Pfeifer | 250/320 X |

Primary Examiner—Edward J. Wise
Attorney, Agent, or Firm—Hill, Van Santen, Steadman, Chiara & Simpson

[57] ABSTRACT

A program control device for the photographic cycle is present, which contains an electronic read-only memory for each photographic program. A resettable pulse counter is actuated step-by-step by a clock pulse generator and controls the selected memory to deliver program signals predetermined by its program. The outputs of all read-only memories are connected to the component parts they control via a program selector circuit. A correction memory is controllable for the input of correction program elements and is connected in parallel to the read-only memories. A recognition memory controlled by the pulse counter is connected to the program selection circuit and the program steps to be corrected are storable therein, so that, upon reaching such a program step, the correction memory (60) supplies the program in place of the respectively selected read-only memory.

4 Claims, 2 Drawing Figures

X-RAY DIAGNOSTIC INSTALLATION FOR X-RAY PHOTOGRAPHS

CROSS REFERENCE TO RELATED APPLICATION

The present application is an improvement over my copending application U.S. Ser. No. 791,060 filed Apr. 26, 1977, now U.S. Pat. No. 4,137,571 issued Jan. 30, 1979. The detailed description and drawings of said copending application are incorporated herein by reference.

BACKGROUND OF THE INVENTION

The invention relates to an x-ray diagnostic installation for x-ray photographs comprising a program control device for the photographic cycle which contains an electronic read-only memory for each photographic program, whose input is connected to a resettable pulse counter which is actuatable step-by-step via a clock pulse generator and which memory delivers program signals predetermined by its program that correspond to the output signals of the pulse counter, and wherein the outputs of all read-only memories are connected to the component parts they control via a program selector.

In an x-ray diagnostic installation of this type (U.S. Ser. No. 791,060 filed Apr. 26, 1977), the program storage and program control during a photographic cycle ensue purely electronically. Therefore, the scanning of mechanical recording carriers, e.g. data cards (U.S. Pat. No. 3,999,044), is not necessary and the operational dependability is very high. The program selection can take place in a simple manner by means of keys. Because of the use of electronic read-only memories, it is possible to conduct a program trial run, wherein for example the values and magnitudes respectively predetermined are optically indicated.

In an x-ray diagnostic installation of the type cited, there is often a desire to alter, i.e. to correct, individual program steps of a fixed program. In a further development of the subject matter of the parent application, there exists indeed the possibility of freely programming a photographic program by means of a freely programmable memory. In many cases, however, the physician does not desire to make up an entirely new program, but rather to alter only a few or even only one program step of a fixed program.

SUMMARY OF THE INVENTION

The object underlying the invention, is to construct an x-ray diagnostic installation of the type initially cited in such manner that an alteration of a fixed program is quickly and simply possible.

This object is inventively achieved in that a correction memory is connected in parallel to the read-only memories, to which correction memory, selecting means for the input of a correction program are connected; and in that a correction recognition memory targeted by the clock generator is connected to the program selection circuit, in which correction recognition memory the program steps to be corrected are storable and which, upon reaching such a program step, selects the correction memory in place of the respectively selected read-only memory. In the inventive x-ray diagnostic installation, the correction of individual program steps of a fixed program is possible in a simple manner via the correction memory. To this end, the user need only input the new program for the program steps to be altered into the correction memory. Upon reaching these program steps during a photographic cycle, the correction recognition memory effects an automatic switch-over from the respectively selected read-only memory to the correction memory.

Details of the invention derive from the sub-claims.

In the following, the invention is explained in greater detail on the basis of a sample embodiment illustrated in the accompanying sheets of drawings; and other objects, features and advantages will be apparent from this detailed disclosure and from the appended claims.

DETAILED DESCRIPTION

Figure 1:
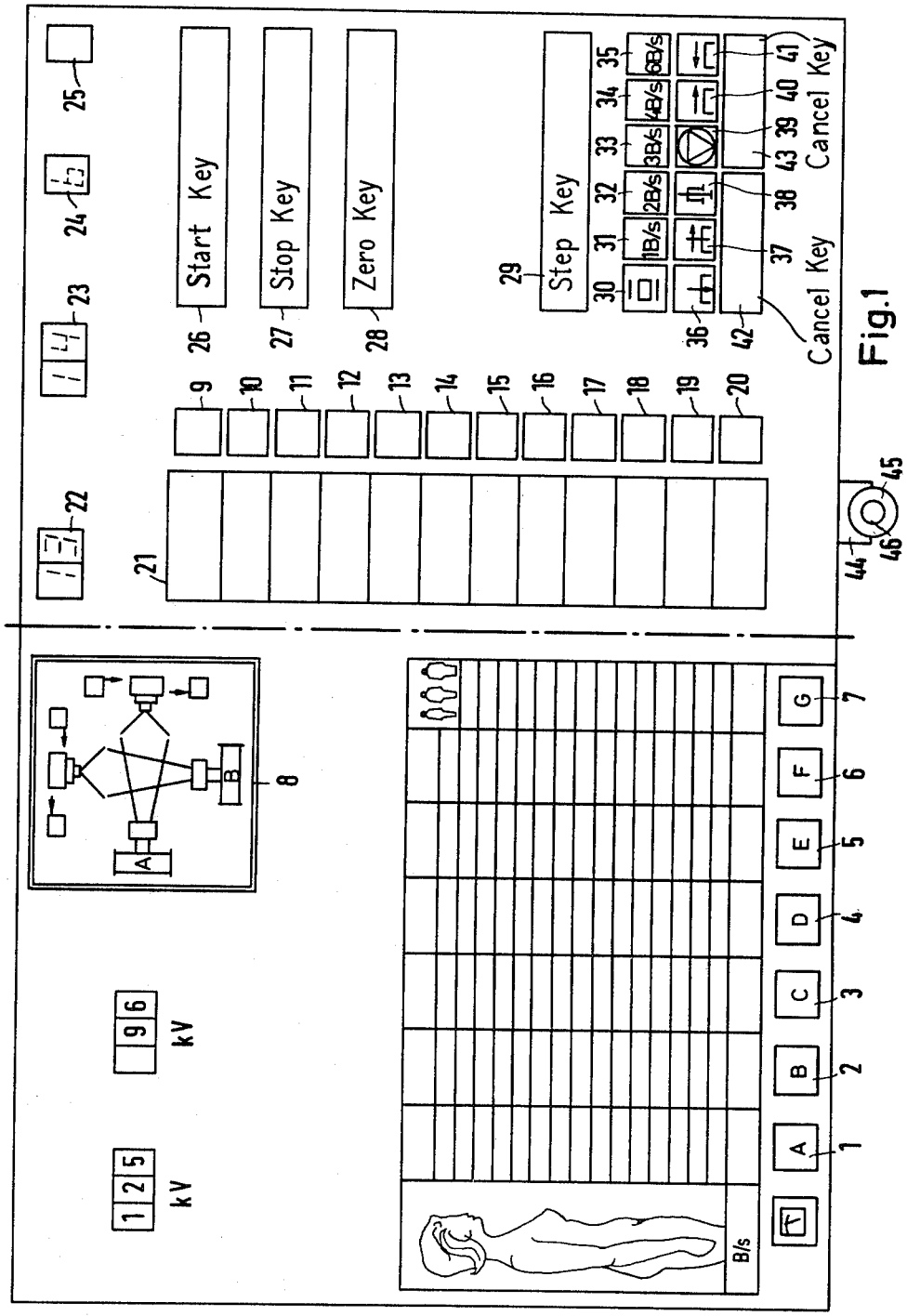
FIG. 1 is a view of an operating console of an x-ray diagnostic installation according to the invention.

According to FIG. 1, the operating desk comprises, in that part illustrated to the left of the dot-dash line, a plurality of organ keys 1 through 7, which permit the selection of the photographic exposure values for a photograph or photographic series respectively in an organ-programmed manner. In the example, the operating console acts as an angiographic exposure installation for producing x-ray photographs in two planes in accordance with the operational chart 8 with the help of two serial film cameras. The console also comprises indicators for displaying the respective x-ray tube voltages and further magnitudes.

In the right hand part of the operating console, according to FIG. 1, there are twelve program keys 9 through 20, to which an indicator field 21 is allocated, in which field the program allocated to each key is indicated. Further, an indicator field 22 for the program number, an indicator field 23 for the respective point in time present since program initiation, an indicator field 24 for the respective image frequency, and an indicator field 25 for the film supply are provided. A start key 26 and a stop key 27 are provided for program monitoring. For the selection of the program initiation, a zero key 28 is provided. A program is manually sequenced by means of a step key 29. Further, keys 30 through 41 with symbols for the selectable values and magnitudes are provided, said keys having two functions, namely the one being to indicate the respective value at the check-out of the selected program and the other being to freely program any desired program when key 20 is depressed. The freely programmed program is completely cancellable by means of cancel key 42. In order to cancel the respectively last freely programmed input value, a cancel key 43 is provided.

When key 9 is pressed, then no automatic program cycle of a photographic series ensues. In this case, the physician actuates one of the organ keys 1 through 7 and selects the other values manually, in a manner not illustrated. If one of the constant given photographic programs is chosen that are selectable by means of keys 10 through 19, then one of those keys is pressed. In the example, key 13 is depressed and, accordingly, the number 13 appears in the indicator field 22. The constant predetermined program assigned to key 13 can be checked out by actuating the start key 26. In field 23, the elapsed time of the program is now indicated in seconds and keys 30 through 41 light up, corresponding to the respectively set value. For purposes of control, this automatic program cycle can be arrested by depressing stop key 27. Further, a return to the point of start of the program is possible by pressing zero key 28. In this case, the indication zero appears in the elapsed time indicator field 23 and the program cycle can begin anew.

Should it be desired that the program selected by means of one of the keys 10 through 19 now in fact cycle, then a start switch 45 is taken in hand from a supporting-mount device 44 where it hangs and its button 46 actuated. The selected program now cycles automatically, i.e., first for example, a contrast agent injection is automatically carried out (key 38 lights up), then a photograph series ensues spanning two seconds with an image frequency of two images per second (key 32 lights up), then a table displacement ensues, etc. The keys 30 through 41 then respectively light up.

When key 20 is actuated, then it is possible to input any random photographic program by means of the step key 29. To this end, first the requisite values for the first program step (0. to 1. second) are input by means of the keys 30 through 41. Then the step key 29 is actuated and the requisite values are input for the second program step by means of keys 30 through 41, and so forth. In so doing, the cancel key 42 allows cancellation of the complete manually input program, whereas the cancel key 43 allows a cancellation of the last respective input program step.

Figure 2:
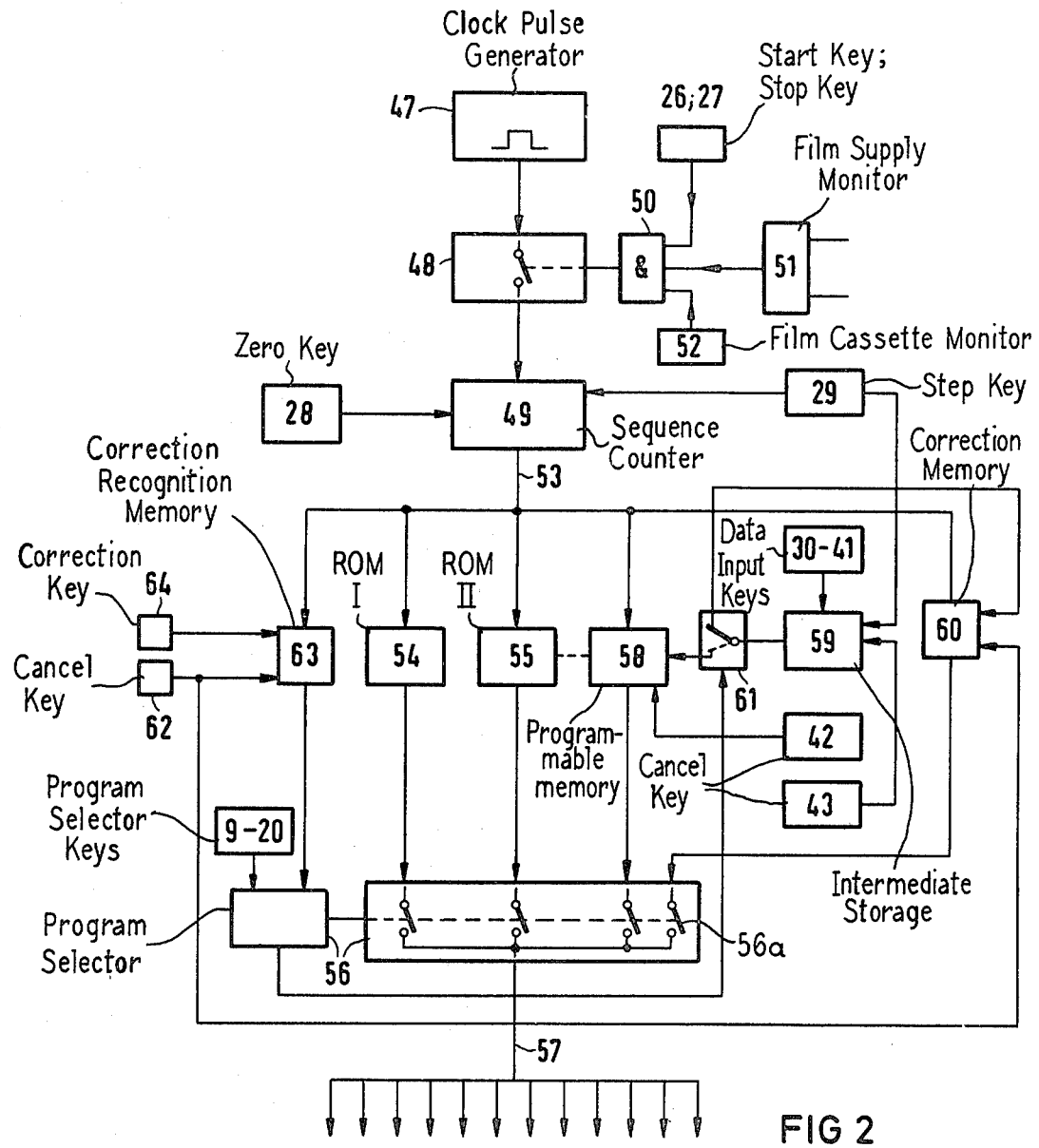
FIG. 2 is the circuit diagram of an x-ray diagnostic installation according to the invention.

In FIG. 2, a clock pulse generator 47 is illustrated, which supplies output pulses at the rate of one pulse per second to a gate circuit 48. The output of the gate circuit 48 is connected to a sequence counter or resettable pulse counter 49. The gate circuit 48 is activated by an AND circuit 50, at whose inputs the keys 26 and 27 as well as a film supply monitoring installation 51 and a film cassette monitoring installation 52 for sensing the presence of the collector cassette of the film camera are connected. When the start key 26 is pressed, if the requisite film supply is present and if the collector cassette is empty, then the AND circuit 50 closes the gate circuit 48 and the pulses of the clock pulse generator 47 are supplied to the sequence counter 49, i.e., the photographic program begins. The sequence counter 49 delivers a signal at its output 53, which signal characterizes (e.g. by means of a binary coded decimal output in parallel, corresponding to the time shown at 22) the respective step and is supplied in parallel to a plurality of read-only memories whose number is equal to the number of program keys; in the sample embodiment this corresponds to ten program keys 10 through 19. The output information of the sequence counter 49 characterizing the respective step and hence the respective number of seconds of elapsed time, effects that all read-only memories 54, 55, etc., deliver signals at their outputs that fix the photographic values corresponding to the respective time step; thus for example the image frequency of the film camera, the table position, the focus of the x-ray tube, etc. Via a program selector circuit 56, only one of the memories 54, 55, etc., 58, 63 is actually connected to the output 57 that leads to the component parts that are to be controlled. The program selector circuit 56 is connected to the program selector keys 9 through 20.

A freely programmable memory 58 is allocated to key 20, to which memory an intermediate storage 59 is connected. The contents of memory 58 can be cancelled by means of cancel key 42, whereas the contents of the intermediate storage 59 can be cancelled by means of cancel key 43. The step key 29 is likewise connected to the intermediate storage 59 and the sequence counter 49. Finally, the keys 30 through 41 are also connected to the intermediate storage 59.

For the free programming of the memory 58, the desired value combination or data is input into the intermediate storage 59 by means of the keys 30 through 41. When the step key 29 is subsequently actuated, then the contents of the intermediate storage 59 is read via a change-over switch 61 positioned as indicated by the broken line into the memory 58 and this data is stored therein under the control of the sequence counter 49. Subsequently, the next value combination assigned to the next program step can be input into the intermediate storage 59 by means of the keys 30 through 41. After actuation of the step key 29, this value combination, too, is read into the memory 58, etc. The entire contents of the memory 58 can be cancelled by actuating the cancel key 42, whereas the last respective input value combination can be cancelled by actuating the cancel switch 43.

From FIG. 2 it can be ascertained that, in addition to the read-only memories 54, 55, etc., and the freely programmable memory 58, a correction memory 60 is provided, which correction memory is likewise loaded step by step under the control of the output signals of the sequence counter 49 and is connectable to the output 57 in place of one of the memories 54, 55, etc., 58 by means of the program selection circuit 56. With the switchover of switch 61 to the position indicated by a heavy line, the correction memory 60 can be programmed by means of the keys 30 through 41 and possesses a cancel input which is connected to a cancel key 62. The cancel key 62 is also further connected to a correction recognition memory 63, which is loaded with a bit signal for identifying a correction program step (with respect to a fixed program sequence which is to be corrected). The address at which the bit signal is stored is determined by means of the output signals of the sequence counter 49 and the stored correction bit signal then controls the program selection circuit 56 during an actual execution of the corrected program. The correction recognition memory 63 can be set by means of a correction key 64. The memories 60 and 63, thus, receive coded information from the sequence counter 49 which characterizes the momentary program step.

For the correction of a fixed value program, the program cycle is monitored by actuating start key 26, and then is stopped at the place of correction by means of the stop key 27, or the user keys himself forward to the place of correction via the step key 29. Upon reaching the place of correction, switch 61 is actuated to the solid line position and the corrected information is input into the intermediate storage 59 via the keys 30 through 41. With the next step pulse, the information residing in the intermediate storage 59 is transmitted into the correction memory 60 via the change-over switch 61 and stored at the current address being output by sequence counter 49.

After input of the correction data, the correction key 64 is pressed and, by so doing, a correction bit for the corresponding address in the correction recognition memory 63 is set. This correction bit makes it possible to recognize that a correction is to ensue for the corresponding program step and engages, via switch 56a of the program selection circuit 56, the correction memory 60 upon reaching this program step during a program cycle and disengages the selected read-only memories 54, 55, etc., or also the memory 58. For the program cycle of the read-only memory such as 54 whose program has been corrected, this means that the individual functions of the x-ray diagnostic installation are controlled from the read-only memory 54 until a disengagement of the read-only memory 54 ensues by means of the correction recognition memory 63. Subsequently, the control of the functions ensues from the correction memory 60, which is again disengaged after the execution of its control function so that the further control again ensues by means of the selected read-only memory 54. Correction memory 63 can be controlled by a gate circuit so that its content actuates program selector 56 only for a specifically selected read-only memory, or respective correction components such as 60–64 and 56a can be provided for respective read-only memories.

A fixed program can be corrected in the manner described at as many places as is desired. On account of this correctability of fixed programs, it is attained that the entire examination spectrum, for example for angiography, can be covered by a small number of fixed programs.

The data-input switch-over by means of the switch-over 61 serves the purpose that information coming from the keys 30 through 41 can be transmitted either into the correction memory 60 or into the freely programmable memory 58. With the selection of the freely programmable memory 58, the switch 61 is switched over into the position indicated by a broken line by means of the program selection circuit 56 (in response to actuation of key 20). In the case of all other programs, the switch 61 assumes the position indicated by a heavy line.

Each read-only memory 54, 55, etc., can be a so-called PROM, i.e., a programmable read-only memory. The freely programmable memory 58, the correction memory 60 and the correction recognition memory 63 can be a so-called RAM (random-access-memory).

In FIG. 2, only two read-only memories 54, 55 are indicated. Of course, more read-only memories are present in the sample embodiment, namely ten. This is indicated by the broken line.

It will be apparent that many modifications and variations may be effected without departing from the scope of the novel concepts and teachings of the present invention.

I claim as my invention:

1. Program control apparatus for the photographic operating sequence of an x-ray photographic installation comprising a series of memory circuits for storing respective photographic program sequences, a resettable pulse counter being connected with the address input of each of said memory circuits for sequentially selecting the program steps of the respective memory circuits, a pulse generator for supplying program signals to the pulse counter for sequentially selecting the program steps of the respective memory circuits, and a program selection circuit connected with the outputs of the memory circuits for transmitting the output signals from a selected one of the memory circuits, wherein the improvement comprises a correction memory (60) for selectively storing respective corrected photographic program steps representing corrections for selected program steps of said memory circuits, said correction memory (60) having an address input connected with said resettable pulse counter (49) for enabling the selection of the corrected photographic program step corresponding to the count of said pulse counter (49), and having an output connected with said program selection circuit (56) for supplying such corrected photographic program step thereto, a correction recognition memory (63) having an address input connected with said resettable pulse counter (49) and operable for storing correction signals for identifying the counts of said pulse counter (49) for which the respective corrected photographic program steps are stored in said correction memory (60) and having a correction recognition output connected with said program selection circuit (56) for signalling the program selection circuit (56) when a stored correction signal in said correction recognition memory (63) corresponds to the current count of said pulse counter (49), said selection circuit (56) having selection switch means (56a) controlling the selection of said correction memory (60) for control of the photographic operating sequence, and being connected with said correction recognition output and responsive to said signalling therefrom for disabling transmission of the output signals from the selected one of the memory circuits and for effecting in place thereof the transmission of the corresponding corrected photographic program step from said correction memory (60).

2. Apparatus according to claim 1 with said memory circuits comprising a series of read-only memories and a freely programmable memory, selection means (30 through 41, 59) manually actuatable for the generation of program steps, a switch-over installation (61) having an input connected with said selection means (30 through 41, 59) and having a first output connected to said freely programmable memory and having a second output connected with said correction memory, said switch-over installation (61) being selectively operable to connect its input with said first output for supplying manually selected program steps to said freely programmable memory, and being selectively operable to connect its input with said second output for supplying manually selected program steps to said correction memory (60).

3. Apparatus according to claim 2 with said switch-over installation (61) being controlled by the program selector (56), and said program selector (56) being responsive to activation of said freely programmable memory (58) to place said switch-over installation in the condition connecting its input to said first output thereof.

4. Apparatus according to claim 1 with a cancel arrangement (62) being connected with said correction memory (60) and with said correction recognition memory (63) and operable in response to manual actuation for cancelling the content of the correction memory (60) and of the correction recognition memory (63).

* * * * *